Aug. 3, 1954
N. KAPLAN
2,685,360
FISH HOLDING AND CONVEYING MEANS FOR FISH CLEANING MACHINES
Filed Oct. 9, 1950
2 Sheets-Sheet 1
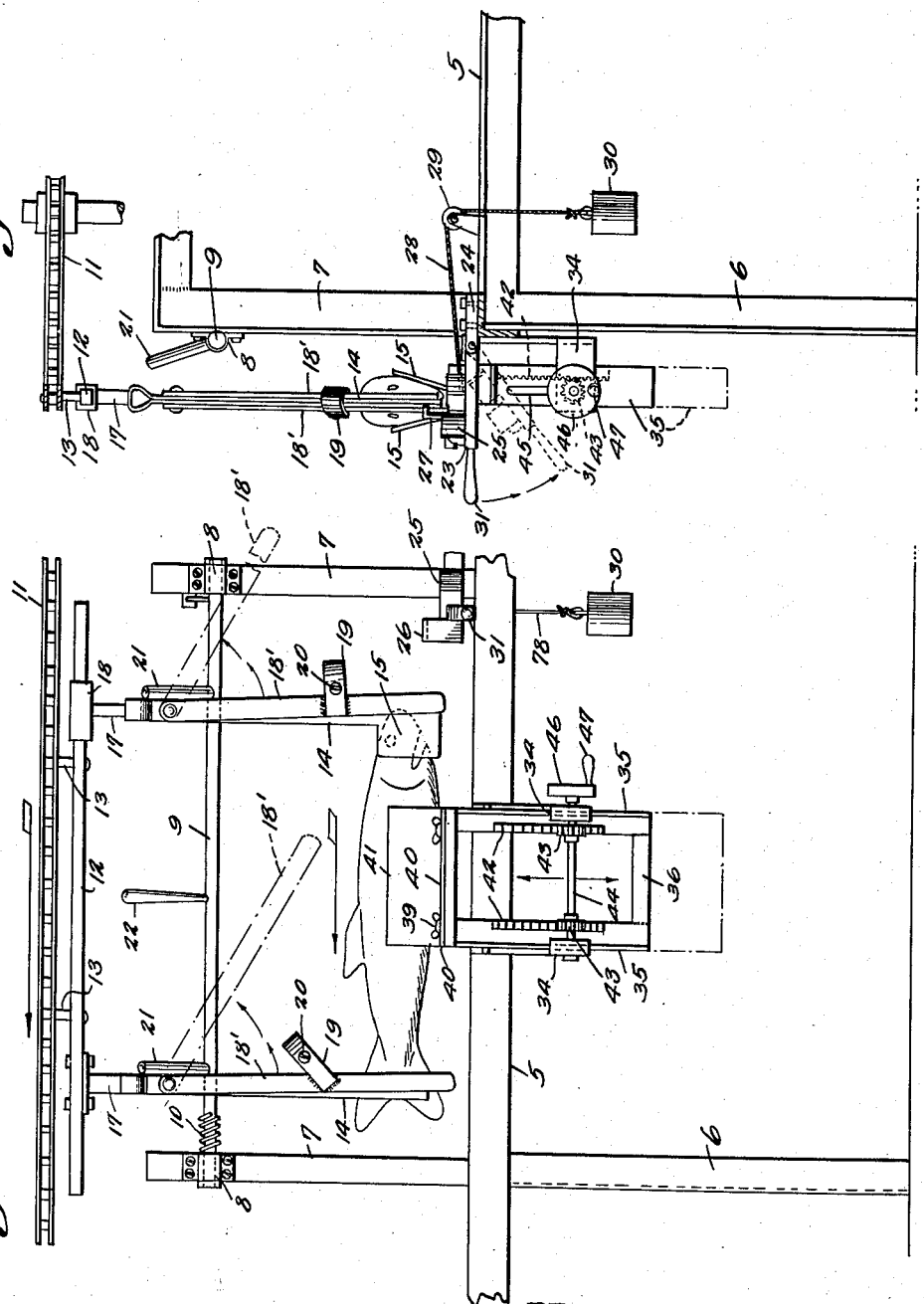
Nathan Kaplan
INVENTOR
BY C.A.Snow & Co.
ATTORNEYS.

Aug. 3, 1954
N. KAPLAN
2,685,360
FISH HOLDING AND CONVEYING MEANS FOR FISH CLEANING MACHINES
Filed Oct. 9, 1950
2 Sheets-Sheet 2
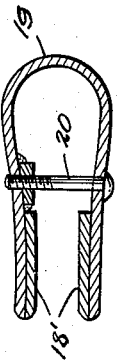
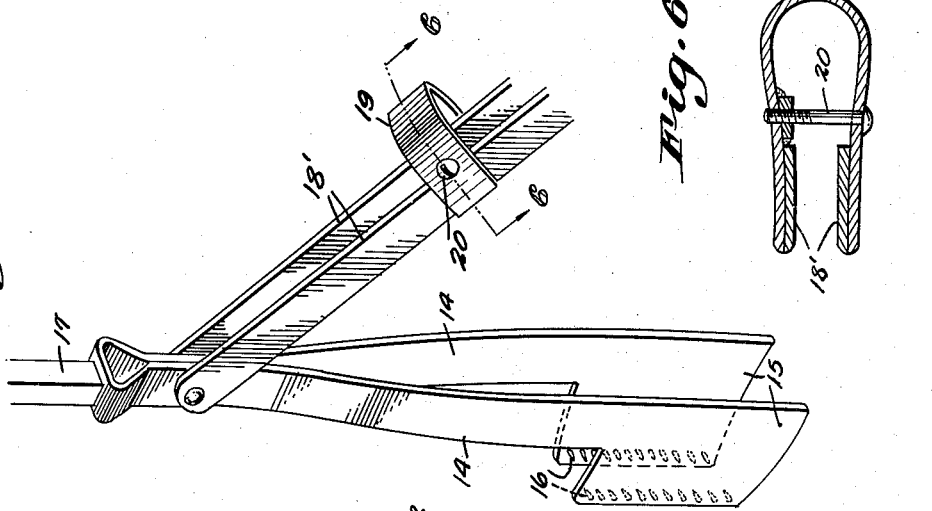
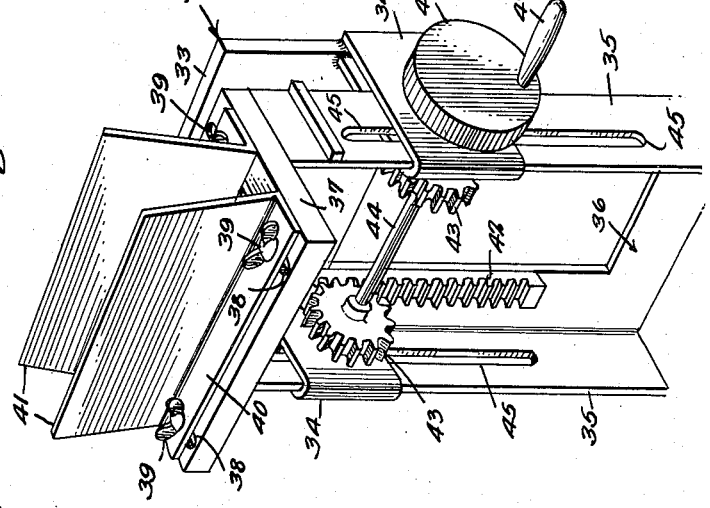
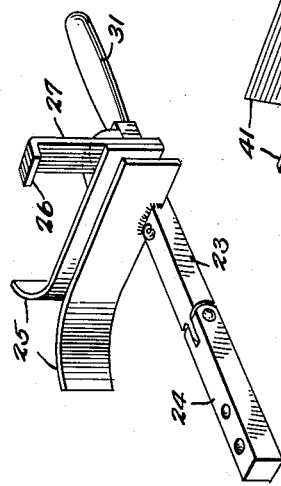
Nathan Kaplan
INVENTOR
BY C.A.Snow&Co.
ATTORNEYS.

Patented Aug. 3, 1954

2,685,360

UNITED STATES PATENT OFFICE 2,685,360

FISH HOLDING AND CONVEYING MEANS FOR FISH CLEANING MACHINES

Nathan Kaplan, Atlanta, Ga.

Application October 9, 1950, Serial No. 189,141

3 Claims. (Cl. 198—179)

This invention relates to fish scaling and cleaning machines and aims to improve generally the construction as shown in my patent number 2,345,607, by providing an improved fish conveying and holding means to maintain the fish in their proper positions for scaling and cleaning, as they pass through the machine.

An important object of the invention is to provide means to facilitate the handling and holding of the fish as they are conveyed to the scaling members and cleaning knife of the machine, thereby speeding up the fish scaling and cleaning operation.

Another object of the invention is to provide means for holding the fish with the sides of the fish in vertical planes, the bellies of the fish being disposed downwardly for engagement by the cleaning knife of the machine while the sides of the fish are held for proper contact by the scaling members.

Still another object of the invention is to provide means for supporting the fish in an upright position to be readily picked up by the fish holding and conveying means.

With the foregoing and other objects in view which will appear as the description proceeds, the invention consists of a certain novel details of construction and combinations of parts hereinafter more fully described and pointed out in the claims, it being understood that changes may be made in the construction and arrangement of parts without departing from the spirit of the invention as claimed.

Referring to the drawings:

Figure 1 is an elevational view illustrating a section of a conveyor used in fish scaling and cleaning machines equipped with fish holding means, constructed in accordance with the invention.

Fig. 2 is an end elevational view thereof.

Fig. 3 is a perspective view illustrating the trip mechanism of the conveying and holding arms that carry the fish through the machine.

Fig. 4 is a perspective view of the stand and support in which fish are positioned for delivery to the fish conveying and holding means.

Fig. 5 is a perspective view illustrating a pair of spring arms formed with gripping jaws that grip the fish holding the fish as it is carried through the machine.

Fig. 6 is a sectional view taken on line 6—6 of Fig. 5.

Referring to the drawings in detail, the reference character 5 indicates a portion of the bench of a fish scaling and cleaning machine supported by the legs 6. Rising from the bench 5, are spaced posts 7 which posts are provided with bearings 8 in which the ends of the rod 9 are mounted. A coiled spring 10 has one of its ends secured to the rod 9, the opposite end of the spring being secured to one of the posts 7 adjacent thereto, the action of the spring being to normally rotate the rod 9 and normally hold the rod 9 in its inactive position as shown by Fig. 1 of the drawings. The opposite post 7 is provided with the stop plate 9' against which the pin 10' extending from the rod 9 engages, restricting rotation of the rod 9 beyond a predetermined point.

The reference character 11 indicates an endless chain to which bars 12 are secured, as by means of the arms 13. While only one of these bars is shown in the present drawings, it is to be understood that there are a plurality of these bars 12 supported by the endless chain 11, the bars 12 being arranged predetermined distances apart.

These bars 12 provide the supports for the gripping and holding arms 14 which are constructed of spring metal with jaws 15 at their lower ends, the jaws 15 being wide and provided with teeth 16 that bite into the fish being moved through the machine, to securely hold the fish to the arms.

The gripping and holding arms 14 are secured to the rods 17 which in turn are secured to the bars 12, by the plates 18 which are bolted thereto.

Cooperating with the gripping and holding arms 14 are spring securing arms 18' that are pivotally connected with the holding arms 14, the securing arms 18' being connected intermediate their ends by means of the bowed spring tensioning member 19 secured to the spring arms 18' preferably by welding, the spring tensioning member being of U-shaped formation. A bolt indicated at 20 connects the arms of the U-shaped spring tensioning member and provides means whereby the arms of the spring tensioning member may be adjusted to regulate the tension on the arms 14. It will of course be understood that these gripping and holding arms 14 are arranged in groups of two, as shown by Fig. 1 of the drawing, one pair of arms 14 operating to grip a fish at the head, while the cooperating pair of arms 14 grip the tail of the fish being cleaned. The spring arms 18' are so constructed that when they move out of contact with the gripping and holding arms 14, the arms 14 will spring outwardly separating the jaws 15, to allow a fish to be positioned therein. When the spring arms 18' have been moved to their inactive positions as shown by dotted lines in Fig. 1 of the drawings, they assume positions directly under the rods 21 that extend laterally from the rod 9. The handle 22 which is secured through the rod 9 at a point intermediate the ends thereof, affords means whereby the attendant may by pulling the handle 22 downwardly cause the rod 21 to engage the arms 18' associated therewith, moving the arms 18' to their positions over the arms 14, closing the arms 14 to cause the jaws 15 thereof to grip the fish and hold the fish in proper horizontal position with the sides thereof in vertical planes to present the fish in the desired position for scaling and cleaning.

The reference character 23 indicates a pivoted arm connected to one end of the block 24 which is bolted to the bench of the machine. This arm 23 provides the support for the spaced cam blades 25 between which the jaws 15 move in passing to a position to pick up a fish to be scaled and cleaned, the movement of the jaws between the cam blades 25 operating to guide the spring arms 18', to a position to be engaged by the right angled end 26 of the upstanding stationary arm 27 which trips the arms 18' and moves them to the dotted line position as shown by Fig. 1, leaving the jaws open to receive a fish. Connected to the main portion of the pivoted arm 23, is the cable 28 which operates over the idle pulley 29 supported on the bench, the weight 30 being secured to one end of the cable 29, to normally urge the pivoted arm 23 upwardly. This vertical adjustment of the pivoted arm 23 is provided to adapt the device for use in conveying and holding fish of various sizes. On one end of the arm 23, is the handle 31 by means of which the pivoted arm 23 may be manually operated if desired. Secured to the bench, at a point between the posts 7, is a trough 32 which includes the plate 33 which is secured to the bench. Extending forwardly from the plate 33 adjacent to the side edges thereof, are the guides 34 through which the side bars 35 of the frame proper 36 move. The upper ends of the bars 35 are connected by the plate 37 which is formed with elongated openings 38 in which the bolts 39 operate, the bolts 39 also being disposed in openings formed in the angular ends 40 of the inclined plates 41, between which the fish to be picked up by the arms 14, is positioned. Due to this construction, it will be seen that the inclined plates 41 may be adjusted with respect to each other to widen or narrow the space between the plates 41 adapting the trough for holding fish of various sizes.

Secured to the frame 36, are rack bars 42 that are engaged by the teeth of the gears 43 mounted on the shaft 44 that extends through bearings in the guides 34, the shafts being also disposed within the elongated openings 45 of the side bars 35, so that the frame 36 may be moved vertically as desired.

Secured to one end of the shaft 44, is the disc 46 to which the handle 47 is connected in such a way that rotation of the disc will operate to rotate the gears 43 and move the frame 36 as described.

In operation, a fish is positioned within the trough 32, and as the arms 14 pass through the spaced cam blades 25, the arms 18' will contact with the right-angled end 26 of the arm 27, causing the arms 18' to swing to the dotted line positions shown by Fig. 1 of the drawings.

With this movement, the arms 14 spring laterally opening the jaws 15 so that a fish may be picked up from the trough, by the arms 14 moving through the trough.

The attendant who has control of the movements of the rod 9 will by swinging the handle 22 downwardly, cause the rods 21 to engage the arms 18', swinging the arms over the arms 14, causing the jaws to securely clamp the head and tail of the fish respectively holding the fish in a horizontal position with the sides of the fish in vertical planes. With the fish in this position, the belly of the fish will move over the cleaning knife of the fish scaling and cleaning machine to the end that the fish will be properly cut for cleaning.

From the foregoing it will be seen that due to the construction shown and described, I have provided means for automatically gripping the head and tail respectively of a fish to properly support the fish and move the fish into the scaling and cutting means to properly clean the fish.

Having thus described the invention, what is claimed is:

1. A fish holding and conveying apparatus for fish cleaning machines comprising a supporting frame, an endless chain operating through the machine, pairs of fish holding arms secured to the chain, pairs of securing arms pivotally mounted on the fish holding arms, spring tension members secured to said spring arms biasing said securing arms towards each other, means for moving the securing arms into gripping relation with said fish holding arms gripping a fish therebetween, a stationary arm having a right-angled end disposed in the path of travel of said spring arms, said spring arms adapted to engage said right-angled end releasing said securing arms and gripping arms releasing a fish held therebetween, and means for returning said spring arms into engagement with the clamping arms closing the clamping arms over a fish positioned therebetween being scaled and cleaned.

2. A fish holding and conveying apparatus for fish cleaning machines comprising a supporting frame, an endless chain, bars secured to the chain, pairs of fish holding arms secured to the bars adapted to clamp the tail and head respectively of a fish, holding the fish in a horizontal position with the sides of the fish in vertical planes, spring securing arms movable over the fish holding arms, normally securing the fish holding arms in clamping relation with a fish, cam blades between which said holding arms move, a pivoted arm on which the cam blades are mounted for vertical adjustment, a vertical movable weight and cable connected to the pivoted arms normally urging the pivoted arm upwardly within its frame, and a member on said pivoted arm adapted to move the spring securing arms out of contact with the fish holding arms, releasing the fish held between the fish holding arms.

3. A fish holding and conveying apparatus for fish cleaning machines, comprising a supporting frame, an endless chain operating through the machine, fish holding arms depending from the chain adapted to clamp the tail and head respectively of a fish holding the fish in a horizontal position with the sides of the fish in vertical planes, a vertically adjustable fish supporting member mounted on the frame including inclined plates between which the fish is supported, said fish holding arms being movable through the fish supporting member and adapted to grip a fish held therein, and means for operating the fish holding arms, releasing the fish held therebetween.

References Cited in the file of this patent

UNITED STATES PATENTS

| Number | Name | Date |
| --- | --- | --- |
| 1,019,086 | Quinn | Mar. 5, 1912 |
| 1,528,288 | Carafilidis | Mar. 3, 1925 |
| 2,292,463 | Mill | Aug. 11, 1942 |
| 2,345,607 | Kaplan | Apr. 4, 1944 |
| 2,536,873 | Culp | Jan. 2, 1951 |
| 2,589,701 | Kaplan | Mar. 18, 1952 |